US012511210B2

(12) United States Patent
Santangelo et al.

(10) Patent No.: US 12,511,210 B2
(45) Date of Patent: Dec. 30, 2025

(54) APPARATUS AND METHOD FOR TESTING A PLURALITY OF COMPUTING DEVICES

(71) Applicant: Communications Test Design, Inc., West Chester, PA (US)

(72) Inventors: Aaron Santangelo, Wayne, PA (US); Nilofar Sayyad, Exton, PA (US); Patrick Dameron, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 445 days.

(21) Appl. No.: 18/064,183

(22) Filed: Dec. 9, 2022

(65) Prior Publication Data
US 2024/0193060 A1 Jun. 13, 2024

(51) Int. Cl.
*G06F 11/273* (2006.01)
*G01J 1/42* (2006.01)
*G06F 11/263* (2006.01)
*G06F 11/27* (2006.01)
*G06T 7/00* (2017.01)
*H04N 23/66* (2023.01)
*H04N 23/90* (2023.01)
(Continued)

(52) U.S. Cl.
CPC .......... *G06F 11/273* (2013.01); *G01J 1/4204* (2013.01); *G06F 11/263* (2013.01); *G06F 11/27* (2013.01); *G06T 7/0004* (2013.01); *H04N 23/66* (2023.01); *H04N 23/90* (2023.01); *H04R 1/028* (2013.01); *H04R 1/08* (2013.01); *H04R 3/00* (2013.01); *H04W 24/08* (2013.01); *B25J 9/0096* (2013.01)

(58) Field of Classification Search
CPC ..................................................... G06F 11/273
See application file for complete search history.

(56) References Cited

U.S. PATENT DOCUMENTS 10,040,201 B2    8/2018   Matula et al.
2011/0240812 A1* 10/2011   Simons ................ F16M 13/022
                                                                              248/314

(Continued)

OTHER PUBLICATIONS

International Search Report and Written Opinion for corresponding PCT International Application No. PCT/US2023/079384 issued Mar. 27, 2024, 10 pages.

*Primary Examiner* — Herbert K Roberts
(74) *Attorney, Agent, or Firm* — Duane Morris LLP

(57) ABSTRACT

This application relates to apparatus and methods for testing one or more computing devices. In one example, a testing system includes a testing frame with at least one testing cabinet for housing a computing device under test. The testing cabinet can also include testing equipment such as a camera, a microphone, a speaker, a color test sheet, and an ambient light sensor. Further, the testing frame includes a control cabinet for housing a testing computing device, where the testing computing device is communicatively coupled, through one or more hubs, to each computing device under test. The testing frame may also include a bracket that secures a monitor and a keyboard, where the monitor and keyboard are communicatively coupled to the testing computing device. The testing computing device can control the testing equipment to test various functions of the computing device under test, an may generate status based on the tests.

13 Claims, 7 Drawing Sheets

(51) Int. Cl.
    *H04R 1/02*     (2006.01)
    *H04R 1/08*     (2006.01)
    *H04R 3/00*     (2006.01)
    *H04W 24/08*     (2009.01)
    *B25J 9/00*     (2006.01)

(56) References Cited

U.S. PATENT DOCUMENTS

| | | |
|---|---|---|
| 2014/0278244 A1 | 9/2014 | Humphrey et al. |
| 2015/0294603 A1 | 10/2015 | Braunstein |
| 2016/0187876 A1* | 6/2016 | Diperna ........... G05B 19/41875 702/81 |
| 2017/0068935 A1 | 3/2017 | Cohen |
| 2017/0279945 A1* | 9/2017 | Parsons ................. A47B 87/00 |
| 2021/0241246 A1 | 8/2021 | Liberti |

* cited by examiner

APPARATUS AND METHOD FOR TESTING A PLURALITY OF COMPUTING DEVICES

TECHNICAL FIELD OF THE DISCLOSURE

The disclosed embodiments relate generally to apparatus and methods for testing computing devices, and more particularly, to testing various functionality of computing devices.

BACKGROUND

Computing devices, such as personal computers, laptops, and tablets, among others, are widespread and employed for personal use as well as business use across a multitude of industries. Often times, computing devices must be tested to verify functionality. For instance, before a customer purchases a new computing device, the new computing device may be tested by a manufacturer. As another example, before refurbishing and reselling a computer, the computer may be tested to verify functionality. These testing processes, however, can be complicated, time consuming, and expensive. For example, functionality of and interoperability with various computing devices can vary. For instance, Mac® computers may require a Mac® operating system (e.g., MacOS®) and be capable of particular functionality, while certain personal computers (PCs) may require a Windows® operating system and be capable of same, or differing, functionality.

SUMMARY

The embodiments are directed to apparatus and methods to test a plurality of computing devices, such as personal computers or laptops. The plurality of computing devices may differ, and may execute varying software (e.g., firmware, operating system (OS), etc.). The embodiments may simultaneously perform functional tests on the plurality of computing devices. Further, the embodiments may determine results (e.g. status) of each of the functional tests of the plurality of computing devices, and may provide the results for display.

For instance, in some examples an aluminum frame houses a shield box for a device under test and testing components. The design is modular in that additional frames (e.g., testers) can be chained together to allow for multiple computing devices to be tested at once. The aluminum frame also houses a testing computer (e.g., a PC), and testing equipment that may include, for example, microcontrollers and adapters, audio analysis equipment, and network equipment. Inside the shield boxes are locating fixtures to hold the device under test, fixtures for holding additional testing equipment, and the additional testing equipment. The additional testing equipment may include, for instance, a camera, lights, a speaker, a microphone, and robotics (e.g., a robotic arm) for testing, such as keypad and keyboard testing. In some examples, the functional testing includes testing of one or more of: internal diagnostics (e.g., memory test), Wi-Fi connection, Bluetooth connection, display, speakers, microphone, line out, camera, touchpad, keyboard, ambient light sensor, battery, SD Card, fingerprint sensor, touch bar, and one or more communication ports such as an Ethernet jack, an HDMI port, a USB port, or a FireWire jack.

In some embodiments, a testing system includes a testing frame with at least one testing cabinet (e.g., shield box, device cabinet), where the at least one testing cabinet houses a computing device under test. The testing cabinet also includes a camera secured to the testing cabinet by a first bracket, and a microphone secured to the testing cabinet by a second bracket. Further, the testing frame includes a control cabinet housing a testing computing device, where the testing computing device is communicatively coupled, through at least one hub, to at least one communications port of the computing device under test. The testing frame may also include at least a third bracket that secures a monitor and a keyboard to the testing frame, where the monitor and keyboard are communicatively coupled to the testing computing device.

In some embodiments, a testing system includes a testing frame with a plurality of testing cabinets, each of the plurality of testing cabinets configured to house a computing device under test. The testing frame also includes a control cabinet configured to house a testing computing device. Further, each of the plurality of testing cabinets include a first bracket securing a camera to a corresponding testing cabinet. Each of the plurality of testing cabinets also includes a second bracket securing a microphone to the corresponding testing cabinet, and at least a third bracket configured to secure a monitor and a shelf for a keyboard to the testing frame.

In some embodiments, a method by a testing computer includes transmitting a diagnostics message to a computing device under test, where the computing device under test is located in a testing cabinet of a testing frame, and where the diagnostics message causes the computing device under test to initiate a built-in-test. The method also includes receiving a first status based on the built-in-test. Further, the method includes transmitting a display message to the computing device under test, where the display message causes the computing device under test to display an image. Further, the method includes transmitting a capture message to a camera mounted within the testing cabinet of the testing apparatus, where the capture message causes the camera to capture the image displayed by the computing device under test, and receiving, from the camera, the captured image. The method also includes determining a second status based on the received image. The method further includes transmitting an audio message to the computing device under test, where the audio message causes the computing device under test to play sound using at least one speaker. The method also includes receiving an audio file, where the audio file is based on audio captured using a microphone mounted within the testing cabinet of the testing apparatus. The method further includes determining a third status based on the audio file. The method also includes providing for display the first status, the second status, and the third status.

In some embodiments, a testing computer includes a non-transitory, machine-readable storage medium storing instructions, and at least one processor the non-transitory, machine-readable storage medium. Further, the at least one processor is configured to execute the instructions to perform operations including transmitting a diagnostics message to a computing device under test, where the computing device under test is located in a testing cabinet of a testing frame, and where the diagnostics message causes the computing device under test to initiate a built-in-test. The operations also include receiving a first status based on the built-in-test. Further, the operations include transmitting a display message to the computing device under test, where the display message causes the computing device under test to display an image. Further, the operations include transmitting a capture message to a camera mounted within the testing cabinet of the testing apparatus, where the capture message causes the camera to capture the image displayed by the computing device under test, and receiving, from the camera, the captured image. The operations also include determining a second status based on the received image. The operations further include transmitting an audio message to the computing device under test, where the audio message causes the computing device under test to play sound using at least one speaker. The operations also include receiving an audio file, where the audio file is based on audio captured using a microphone mounted within the testing cabinet of the testing apparatus. The operations further include determining a third status based on the audio file. The operations also include providing for display the first status, the second status, and the third status.

DETAILED DESCRIPTION OF THE EMBODIMENT(S)

Figure 1:
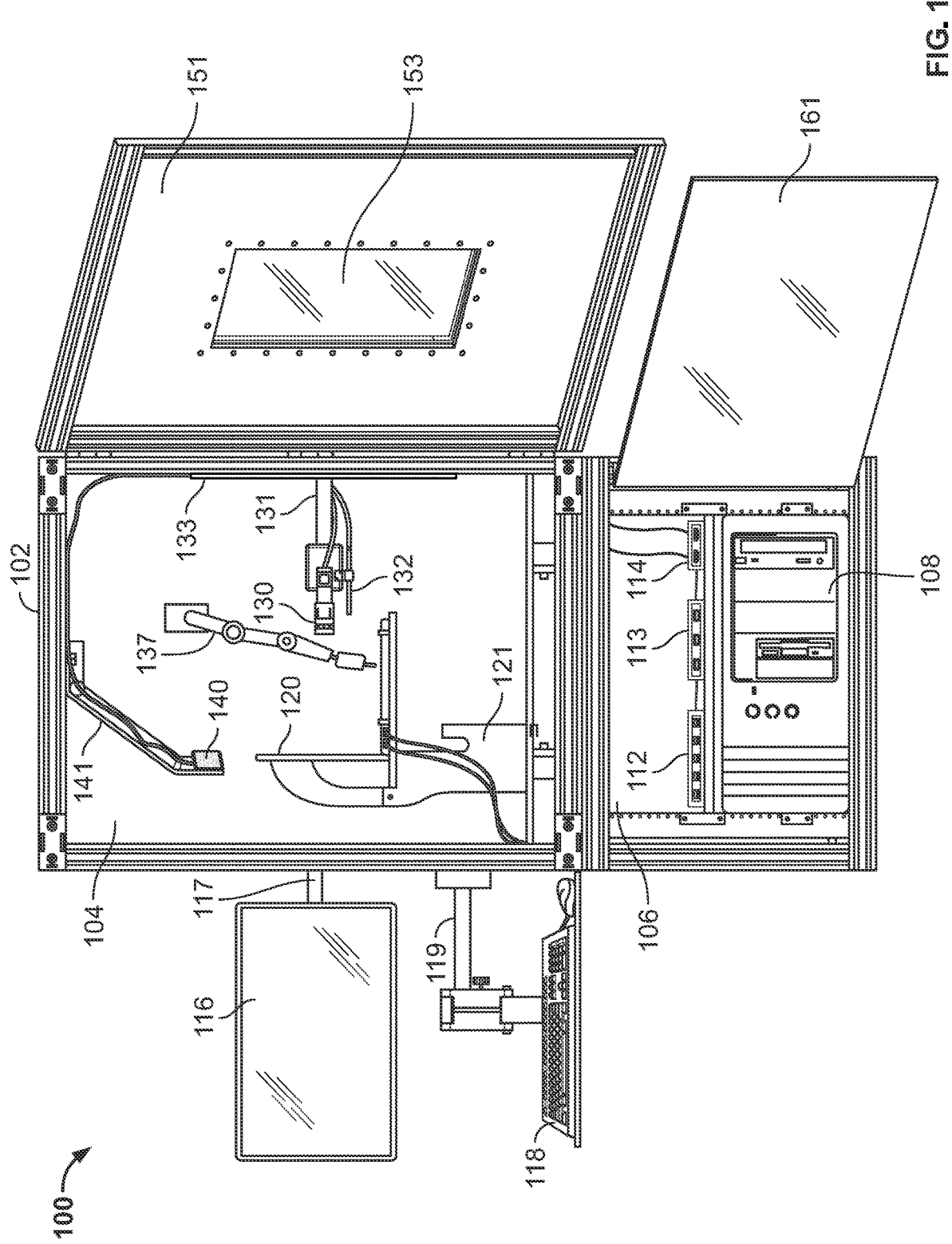
FIG. 1 illustrates a computing device testing system, in accordance with some exemplary embodiments.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein may allow for the testing of one or more computing devices under test (DUTs). For example, and as described herein, a testing frame may include a testing cabinet (e.g., shield box) to test a computing DUT. The testing cabinet may include various testing equipment, such as a camera directed at the computing DUT, a microphone positioned to capture audio from a speaker of the computing DUT, and a speaker to provide audio to the computing DUT. In some examples, the testing equipment includes a robotic arm configured to engage a keyboard, touchpad, touchscreen, or any other suitable input device of the computing DUT. Further, fixtures (e.g., brackets) are employed within the testing cabinet to hold and secure the testing equipment as well as the computing DUT.

The testing frame may also include a control cabinet to house a testing computing device that initiates and executes the testing of the computing DUT. The control cabinet may also include networking equipment, such as on or more hubs or routers, that provide for communication between the testing computing device and the computing DUT. For instance, the computing DUT may be connected through a cable, such as a universal serial bus (USB) cable (e.g., USB, USB 2.0, USB 3.0, etc.), to a hub, such as a USB hub. The hub may be located in the control cabinet. In addition, the testing computing device may be connected to the hub using a similar cable (e.g., USB cable). The testing computing device may execute an application that causes the testing computing device to generate and transmit messages over the cables and to the computing DUT to execute the tests. Additionally or alternatively, the testing computing device may be wirelessly connected to the computing DUT. For instance, the testing computing device may connect to a same network (e.g., Wi-Fi network) as the computing DUT, and may communicate with the computing DUT over the network. In some instances, the testing computing device initiates a Wi-Fi network (e.g., a hotspot), and the computing DUT connects to the initiated Wi-Fi network. In some examples, the testing computing device and the computing DUT connect over a Bluetooth connection.

In some examples, the testing frame includes multiple testing cabinets where each testing cabinet houses a computing DUT. The testing computer may be communicatively coupled to each of the computing DUTs (e.g., through one or more hubs, routers, etc.), and may simultaneously test the computing DUTs. For example, the testing computing device may cause a first computing DUT to execute a test, and a second computing DUT to execute the same, or different, test.

In some examples, the functional testing includes testing of one or more of: internal diagnostics (e.g., built-in-test, memory test), Wi-Fi connection, Bluetooth connection, display, speakers, microphone, line out, camera, touchpad, keyboard, ambient light sensor, battery, SD Card, fingerprint sensor, touch bar, and one or more communication ports such as an Ethernet jack, an HDMI port, a USB port, or a FireWire jack. For example, the testing computing device may perform operations to test one or more of this functionality, and may generate status based on the testing. The testing computing device may display the status on a display.

Referring to FIG. 1, a testing system 100 includes a testing frame 102 with a testing cabinet 104 and a control cabinet 106. A testing cabinet door 151 with a window 153 can be closed or opened to secure or access the testing cabinet 104. A control cabinet door 161 can also be opened or closed to access or secure the control cabinet 106. The testing cabinet 104 may house a computing DUT 120, while the control cabinet 106 can store a testing computing device 108 and networking equipment, such as one or more hubs 112, 113, 114 (e.g., USB hub, Ethernet hub, FireWire hub, etc.).

In addition, the testing system 100 may include a bracket 117 for securing a monitor 116 to the testing frame 102, and a bracket 119 for securing a shelf for a keyboard 118 to the testing frame 102. The monitor 116 and the keyboard 118 are each communicatively coupled to the testing computing device 108. For instance, each of the monitor 116 and keyboard 118 may connect to the testing computing device 108 through a corresponding cable, such as a USB cable. In some examples, brackets 117 and 119 are one bracket, such that the one bracket secures both the monitor 116 and the shelf for the keyboard 118 (and, in some examples, a mouse).

The computing DUT 120, the testing computing device 108, the hubs 112, 113, 114 and the monitor 116 may each be connected to power. For instance, each may include a power cable connected to, for example, a power strip. The computing DUT 120 can include, for instance, any type of computer such as Apple® computers, Windows® computers, and Macintosh® computers, any type of laptop such as Mac® laptops and Windows® laptops, any type of tablet, or any other suitable computing device.

The testing frame 102 may be constructed out of a metal, such as aluminum, an alloy, or any other suitable material. As illustrated, the testing cabinet 104 houses a computing DUT 120 that is secured to a floor of the testing cabinet 104 with a DUT bracket 121. Further, the testing cabinet houses testing equipment including a camera 130, a microphone 140, a speaker 132, and, in some examples, a robotic arm 137. The camera 130 is positioned and configured to capture images of a display of the computing DUT 120. The microphone 140 is positioned and configured to capture audio from the computing DUT 120 (e.g., from a speaker of the computing DUT 120). The speaker 132 is positioned and configured to play audio that can be captured by a microphone of the computing DUT 120. In addition, the robotic arm 137 is positioned and configured to engage a keyboard, touchpad, or touchscreen of the computing DUT 120.

In this example, the speaker 132 is attached to the camera 130, and the camera 130 is attached to an inside wall of the testing cabinet 104 with a camera bracket 131. The microphone is attached to a microphone bracket 141 that is attached to an inside ceiling of the testing cabinet 104. Further, the robotic arm 137 is attached to a back wall of the testing cabinet 104.

The testing computing device 108 may be communicatively coupled to the computing DUT 120 through one or more wired, or wireless, connections. For instance, as described herein, the testing computing device 108 may connect to a same network (e.g., Wi-Fi network, BlueTooth network, etc.) as the computing DUT 120, and may communicate with the computing DUT 120 over the network. Additionally or alternatively, the computing DUT 120 and the computing DUT 120 may connect via one or more hubs 112, 113, 114.

Figure 2A:
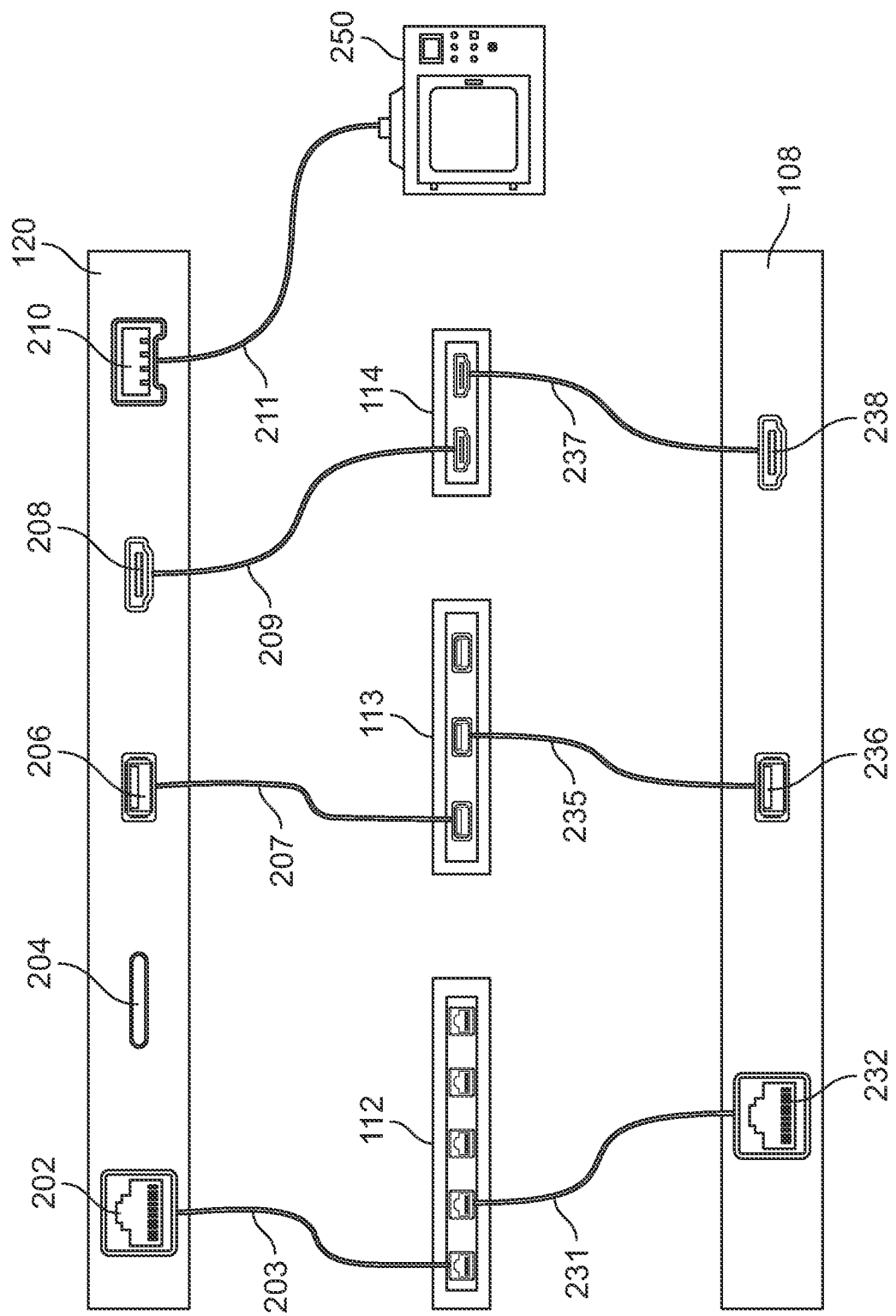
FIGS. 2A and 2B illustrate exemplary portions of the computing device testing system of FIG. 1, in accordance with some exemplary embodiments.

For instance, FIG. 2A illustrates various communication links between the computing DUT 120 and the testing computing device 108. For example, the computing DUT 120 may include one or more of an Ethernet port 202, and SD card slot 204, a USB port 206, an HDMI port 208, and a FireWire port 210. An Ethernet cable 203 may connect the Ethernet port 202 to an Ethernet hub 112. Similarly, a USB cable 207 may connect the USB port 206 to a USB hub 113. Further, an HDMI cable 209 may connect the HDMI port 208 to an HDMI hub 114. Additionally, a FireWire cable 211 may connect the FireWire port to a FireWire test device 250, for example.

The testing computing device 108 may include one or more ports as well, such as one or more of an Ethernet port 232, a USB port 236, and an HDMI port 238. An Ethernet cable may connect the Ethernet port 232 to the Ethernet hub 112. Further, a USB cable 235 may connect the USB port 236 to the USB hub 113, and a HDMI cable 237 may connect the HDMI port 238 to the HDMI hub 114.

The testing computing device 108 may execute instructions (e.g., an application) to perform one or more of the test operations described herein. In some examples, testing computing device 108 tests communications with the computing DUT 120 using one or more of the Ethernet port 232, USB port 236, and the HDMI port 238. For example, the testing computing device 108 may perform operations to detect computing DUT 120 over one or more of the Ethernet, USB, and HDMI connections, and generate a status for each connect based on whether the computing DUT 120 was detected. For instance, if the computing DUT 120 is detected on the Ethernet hub 112 (e.g., testing computing device 108 successfully transmits a message to, or receives a message from, the testing computing device 108), the testing computing device 108 generates a status that the Ethernet port 202 of the computing DUT 120 is operational. If, however, the computing DUT 120 is not detected on the Ethernet hub 112, the testing computing device 108 generates a status that the Ethernet port is not operational. Similarly, the testing computing device 108 may attempt to detect the computing DUT 120 on the USB and HDMI communication links, and generate status based on the detection.

Further, the testing computing device 108 may test the SD card slot 204 by requesting, over a communication link, such as over the USB communication link described herein, information from the computing DUT 120 for an SD card inserted into the SD card slot 204. For instance, the testing computing device 108 may request metadata, or any stored data, for the SD card. The testing computing device 108 may compare the received information to expected information to determine whether the SD card slot 205 is functioning correctly.

Further, the testing computing device 108 may test the FireWire port 210 by requesting, over a communication link, such as over the USB communication link described herein, from computing DUT 120 information about the connected FireWire test device 250. For instance, the computing DUT 120 may request a type of device, or any other suitable information, about the connected FireWire test device 250. The testing computing device 108 may compare the received information to expected information for the FireWire test device 250 to determine whether the FireWire port 210 is functioning correctly.

Referring back to FIG. 1, the testing computing device 108 may cause the computing DUT 120 to perform additional testing, such as to test a microphone, a camera, a speaker, a keyboard, or another function of the computing DUT 120. For instance, testing computing device 108 may generate and transmit a diagnostics message to the computing DUT 120. When received by the computing DUT 120, the diagnostics message causes the computing DUT 120 to initiate a built-in-test. The built-in-test may be a test provided by the manufacturer that is part of a BIOS and, when executed, tests various functions of the computing DUT 120, such as memory testing and communication link testing. Further, and based on the built-in-test, the computing DUT 120 transmits a status to the testing computing device 108. The status may indicate whether each of one or more tests of the built-in-test passed or failed.

Figure 2B:
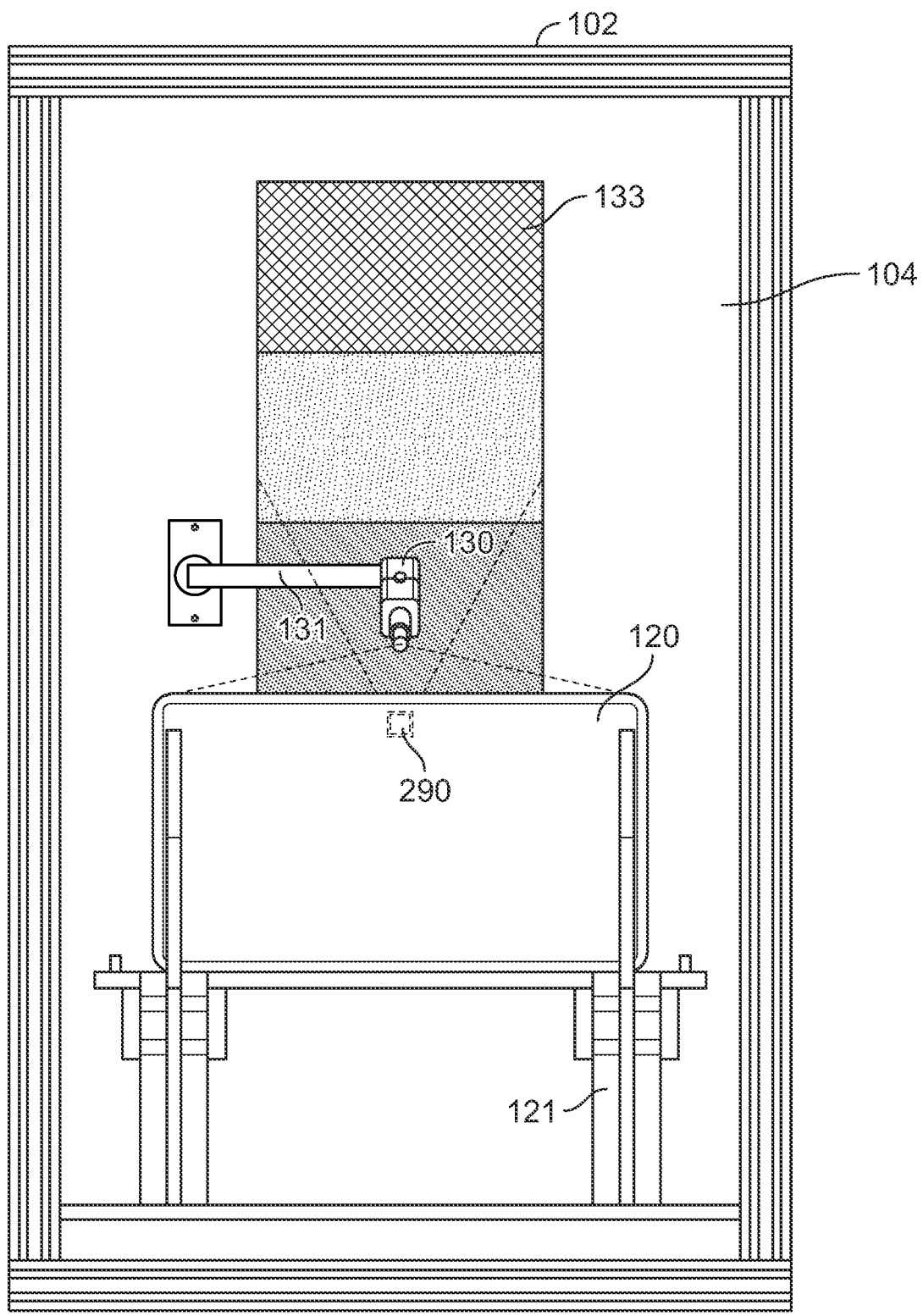

In some examples, testing computing device 108 generates and transmits a display message to the computing DUT 120. When received by the computing DUT 120, the display message causes the computing DUT 120 to display an image within its display. In some instances, the computing DUT 120 obtains an image from memory, and displays the image. In some examples, the display message includes an image to be displayed. The computing DUT 120 extracts the image from the display message, and displays the image. Further, testing computing device 108 may generate and transmit a capture message to the camera 130 (e.g., a microcontroller or processor of the camera 130) causing the camera 130 to capture an image of the display of the computing DUT 120. For example, and with reference to FIG. 2B, camera 130 is positioned to capture an image of the display of the computing DUT 120. Upon receiving the capture message, camera 130 captures the image, and transmits the captured image to the testing computing device 108. The testing computing device 108 may determine a status based on the received image. For example, the testing computing device 108 may compare the image to an expected image (e.g., the image obtained from memory or the image transmitted in the display message) to determine whether the display is operating correctly, and may determine the status based on the comparison.

In some examples, to test a display of the computing DUT 120, a light source, such as a light bulb, may be positioned within the testing cabinet 104. The testing computing device 108 may cause the light source to produce a level of light, and may determine a brightness of the display. For example, the testing computing device 108 may generate and transmit a capture message to the camera 130 causing the camera 130 to capture an image of the display of the computing DUT 120. The testing computing device 108 may receive the captured image from the camera 130, and may determine whether the captured image is within a predetermined range of brightness. If the captured image is within the predetermined range of brightness, the testing computing device 108 generates a status that the test for the display passed. Otherwise, if the captured image is not within the predetermined range of brightness, the testing computing device 108 generates a status that the test for the display failed.

In some examples, testing computing device 108 may generate and transmit a device capture message to the computing DUT 120. Upon receiving the device capture message, the computing DUT 120 may cause a camera, such as camera 290, to capture an image of a color test sheet 133. The color test sheet 133 may include, for example, color bars, or any other suitable image. Further, and in response to the device capture message, the computing DUT 120 may transmit the captured image to the testing computing device 108. The testing computing device 108 may then determine a status of the camera 290 based on comparing the received image to an expected image. The expected image can be on previously taken of color test sheet 133 with a known, working computing DUT 120, and stored in a memory of the testing computing device 108.

In some instances, the testing computing device 108 generates and transmits a device capture message to the computing DUT 120 to cause the computing DUT 120 to capture an image of the color test sheet 133. Once captured, the testing computing device 108 generates and transmits a display message to the computing DUT 120, causing the computing DUT 120 to display the captured image (e.g., the image of the color test sheet 133) on its display. Further, the testing computing device 108 generates and transmits the capture message to the camera 130 causing the camera 130 to capture an image of the display of the computing DUT 120. As described herein, the camera 130 may transmit the captured image to the computing DUT 120. The computing DUT 120 may receive the captured image, and may compare the captured image to an expected image. Based on the comparison, the computing DUT 120 can determine a status of the camera 290 and the display of the computing DUT 120. For instance, the computing DUT 120 may determine a difference between corresponding pixel values of the captured image, and the expected image, and determine whether the images match based on the differences. For example, the computing DUT 120 may determine an average difference value of the computed differences, and determine the images match (e.g., test passed) if the average difference value is below a predetermined threshold. Alternatively, the computing DUT 120 may determine that the images do not match if the average difference value is at or above the predetermined threshold (e.g., test failed).

Referring back to FIG. 1, to test a speaker of computing DUT 120, the testing computing device 108 may generate and transmit an audio message to the computing DUT 120. Upon receiving the audio message, the computing DUT 120 plays a sound using at least one speaker. Further, the testing computing device 108 may configure the microphone 132 to capture audio during this test, and the testing computing device 108 may receive from the microphone 132 an audio file of the captured audio. The testing computing device 108 may determine a status of the at least one speaker based on the captured audio. For example, the testing computing device 108 may compare the captured audio to an expected audio, and determine the status based on the comparison. In some instances, the testing computing device 108 determines the status based on an applying an audio file comparator algorithm to the captured audio and an expected audio file. In some examples, testing computing device 108 receives a fingerprint message from the computing DUT 120 that a finger print has been detected (e.g., by a finger print sensor). In some examples, the fingerprint message indicates whether the detected finger print matches a user's stored finger print. Testing computing device 108 may generate a status that a finger print sensor is working properly if the fingerprint message indicates that a fingerprint has been detected. Otherwise, testing computing device 108 may generate a status that the finger print sensor is not working properly if no fingerprint message is received, or the fingerprint message indicates that no fingerprint has been detected.

Further, testing computing device 108 may provide for display on monitor 116 the status of each test. The status may indicate whether a particular test passed, or failed. In some examples, the testing computing device 108 transmits the status of the tests to another computing device, such as a cloud-based server.

In some examples, testing computing device 108 may test a keyboard or touchpad of the computing DUT 120 using the robotic arm 137. For instance, testing computing device 108 may transmit one or more messages (e.g., adjust messages) to the robotic arm 137 to cause the robotic arm 137 to engage a surface of the computing DUT 120, such as one or more keys of the keyboard. Further, the computing DUT 120 may be configured to send a message (e.g., surface detection message) to the testing computing device 108 identifying that its surface was engaged, such as any engaged keys. Based on receiving the message, the testing computing device 108 may generate a status for the keyboard or touch pad. For example, testing computing device may compare the received keys to the keys the robotic arm 137 was commanded to engage, and determine if they match. If they keys match, then the test passes. Otherwise, if the keys do not match, or a message identifying the engaged keys is not received, then the test does not pass.

In some examples, to test a battery of the computing DUT 120, the testing computing device 108 transmits a message to the computing DUT 120 requesting a battery level. If the battery level is within a predetermined range of an expected battery level, the battery test passes. Otherwise, if the received battery level is not within the predetermined range of the expected battery level, the battery test fails.

In some examples, to test a display of the computing DUT 120, an ambient light sensor may be positioned within the testing cabinet 104. The testing computing device 108 may receive a level of light from the ambient light sensor when the display of the computing DUT 120 is on, and may determine if the level of light received is at least a minimum amount of light (e.g., a predetermined minimum light value). If the level of light received is at least the minimum amount, the testing computing device 108 generates a status that the test for the display passed.

Figure 3:
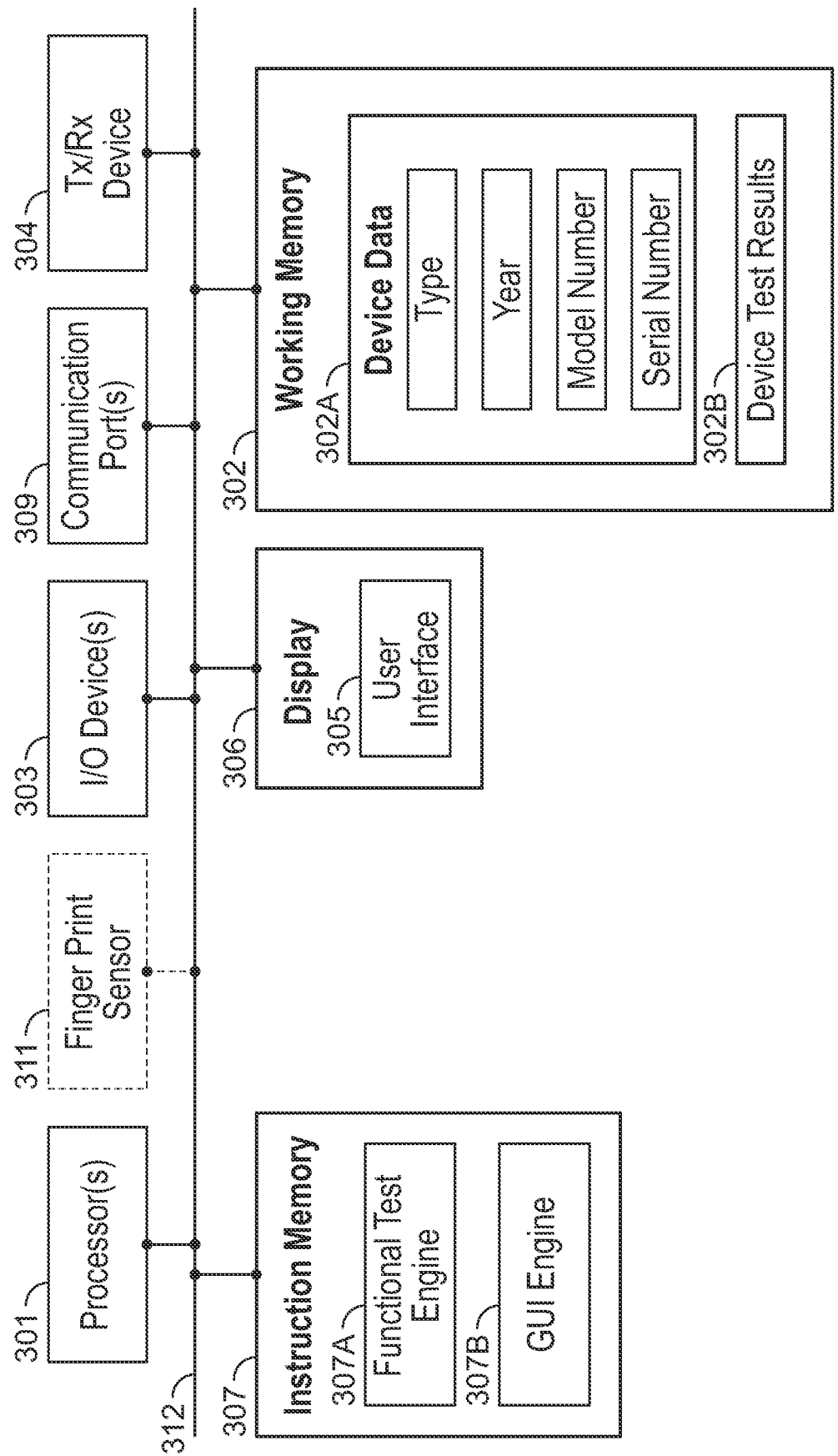
FIG. 3 illustrates a block diagram of a testing computing device, in accordance with some embodiments.

FIG. 3 illustrates an example of the testing computing device 108 of FIG. 1. Testing computing device 108 can include one or more processors 301, working memory 302, one or more input-output devices 303, instruction memory 307, a transceiver 304, one or more communication ports 309, and a display 306, all operatively coupled to one or more data buses 312. In some examples, testing computing device 108 includes a finger print sensor 311. Data buses 312 allow for communication among the various devices, and can include wired, or wireless, communication channels.

Processors 301 can include one or more distinct processors, each having one or more cores. Each of the distinct processors can have the same or different structure. For example, processors 301 can include one or more central processing units (CPUs), one or more graphics processing units (GPUs), one or more application specific integrated circuits (ASICs), one or more digital signal processors (DSPs), and the like. Further, processors 301 can be configured to perform a certain function or operation by executing code, stored on instruction memory 307, embodying the function or operation. For example, processors 301 can be configured to perform one or more of any function, method, or operation disclosed herein.

Instruction memory 307 can store instructions that can be accessed (e.g., read) and executed by one or more processors 301. For example, instruction memory 307 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. In this example, instruction memory 307 includes functional test engine 307A and graphical user interface (GUI) engine 307B.

Functional test engine 307A can include instructions that, when executed by one or more of processors 301, cause processors 301 to perform operations to test one or more computing DUTs, such as computing DUT 120, as described herein. For example, one or more processors 301 may execute the instructions of functional test engine 307A to test one or more of: internal diagnostics (e.g., built-in-test, memory test), Wi-Fi connection, Bluetooth connection, display, speakers, microphone, line out, camera, touchpad, keyboard, ambient light sensor, battery, SD Card, fingerprint sensor, touch bar, and one or more communication ports such as an Ethernet jack, an HDMI port, a USB port, or a FireWire jack. Further, and when executed by the one or more processors 301, the executed functional test engine 307A may cause processors 301 to determine a status for each test.

GUI engine 307B can include instructions that, when executed by the one or more processors 301, causes the one or more processors 301 to provide for display a GUI that indicates the status of each test. For example, the GUI may include a name of each test, and an indication of whether the test passed (e.g., was successful) or not. In some examples, the GUI displays the status information for a plurality of computing DUTs. In some examples, the executed GUI may allow a user to select test operations to be performed on one or more computing DUTs 120, as well as to view status of the one or more computing DUTs 120.

Additionally, processors 301 can store data to, and read data from, working memory 302. For example, processors 301 can store a working set of instructions to working memory 302, such as instructions loaded from instruction memory 307. Processors 301 can also use working memory 302 to store dynamic data created during the operation of testing computing device 108. Working memory 302 can be a random access memory (RAM) such as a static random access memory (SRAM) or dynamic random access memory (DRAM), or any other suitable memory.

As illustrated, in this example working memory 302 includes device data 302A and device test results 302B. Device data 302A may include information for each computing DUT 120, such as a device type, a year of manufacturer, a model number, and a serial number, among other information. The device test results 302B may include status information for any of the tests described herein for each computing DUT. For instance, the device test results 302B may include one or more of a status for an internal diagnostics test (e.g., built-in-test, memory test), Wi-Fi connection test, Bluetooth connection test, display test, speakers test, microphone test, line out test, camera test, touchpad test, keyboard test, ambient light sensor test, battery test, SD Card test, fingerprint sensor test, touch bar test, and a communication ports test such as an Ethernet jack test, an HDMI port test, a USB port test, or a FireWire jack test.

Input-output devices 303 can include any suitable device that allows for data input or output. For example, input-output devices 303 can include one or more of a keyboard, a touchpad, a mouse, a stylus, a touchscreen, a physical button, a microphone, or any other suitable input or output device.

Communication port(s) 309 can include, for example, a serial port such as a Universal Serial Bus (USB) port, an Ethernet port, a universal asynchronous receiver/transmitter (UART) port, or any other suitable communication port or connection. In some examples, communication port(s) 309 allows for the programming of executable instructions in instruction memory 307. In some examples, communication port(s) 309 allow for the transfer (e.g., uploading or downloading) of data, such as data stored within working memory 302.

Display 306 can display user interface 305. User interfaces 305 can enable user interaction with testing computing device 108. For example, user interface 205 can be a user interface for an application that allows the user to enable one or more operations, and to select one or more computing devices 120 under test, as described herein. In some examples, a user can interact with user interface 305 by engaging input-output devices 303. In some examples, display 306 can be a touchscreen, where user interface 305 is displayed on the touchscreen.

Transceiver 304 allows for communication with a network, such as a wireless communication network (e.g., WiFi®, Bluetooth®, etc.). One or more processors 301 are operable to receive data from, and send data to, a wireless network via transceiver 304.

Finger print sensor 311 may detect a finger print of a user. In some examples, testing computing device 108 receives a fingerprint message from a computing DUT 120 that a finger print has been detected by finger print sensor 311. In some examples, the fingerprint message indicates whether the detected finger print matches a user's stored finger print, such as a user's fingerprint stored within working memory 302.

Figure 4:
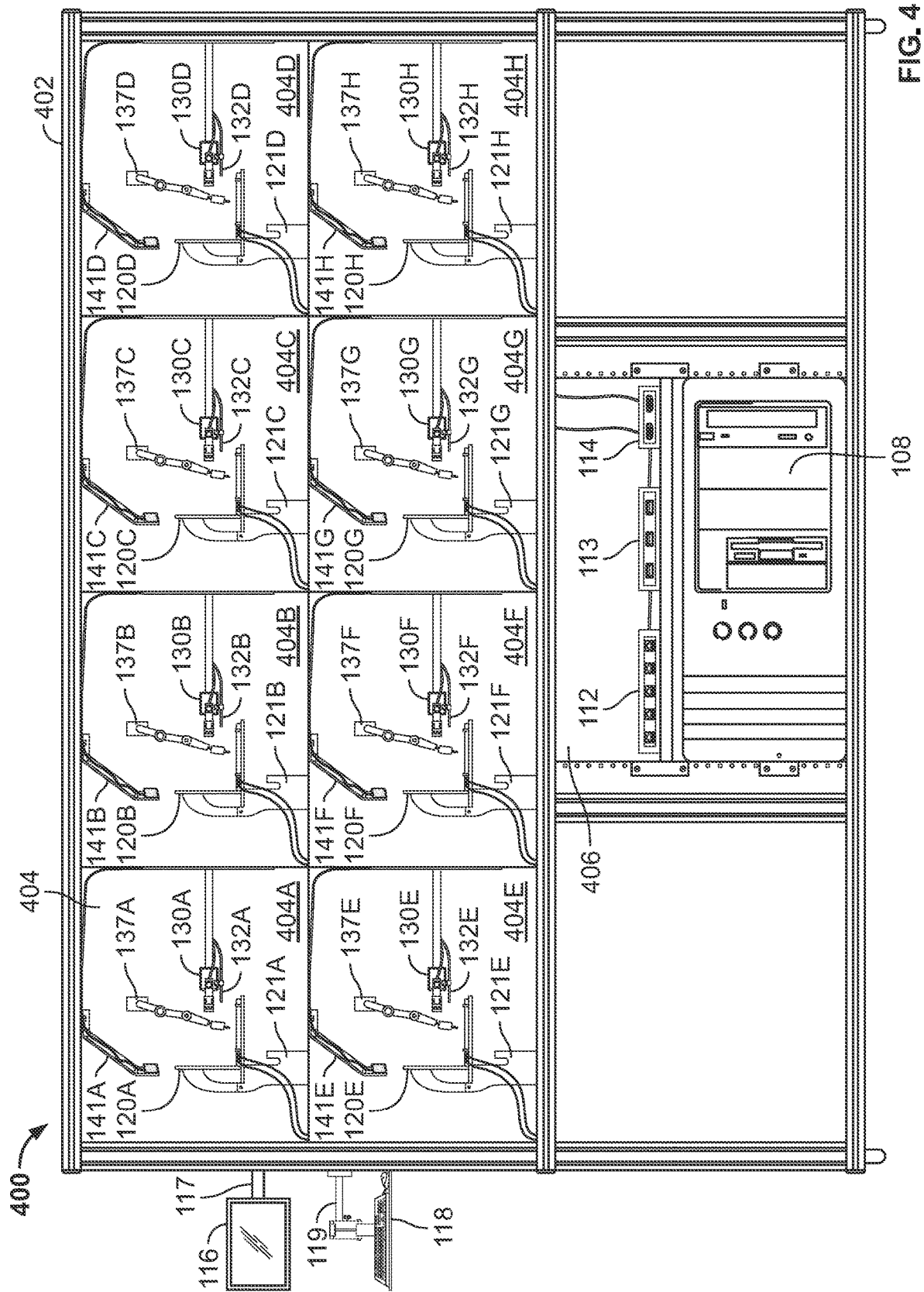
FIG. 4 illustrates a multiple computing device testing system, in accordance with some exemplary embodiments.

FIG. 4 illustrates a multiple computing device testing system 400. The multiple computing device testing system 400 includes a testing frame 402 with a plurality of testing cabinets 404, and a control cabinet 406. Each of the plurality of testing cabinets 404 may include a testing cabinet door 151 with a window 153 that can be opened or closed to access or secure each corresponding testing cabinet 404. Each testing cabinet 404 may house a computing DUT 120. For instance, in this example, testing cabinet 404A houses computing DUT 120A, testing cabinet 404B houses computing DUT 120B, testing cabinet 404C houses computing DUT 120C, and testing cabinet 404D houses computing DUT 120D. In addition, testing cabinet 404E houses computing DUT 120E, testing cabinet 404F houses computing DUT 120F, testing cabinet 404G houses computing DUT 120G, and testing cabinet 404H houses computing DUT 120H. Although eight testing cabinets 404 are illustrated, in other examples, multiple computing device testing system 400 may include more than, or less than, eight testing cabinets 404. Further, the control cabinet 406 stores the testing computing device 108 and networking equipment, such as one or more hubs 112, 113, 114 (e.g., USB hub, Ethernet hub, FireWire hub, etc.).

In addition, the multiple computing device testing system 400 may include a bracket 117 for securing a monitor 116 and a shelf for a keyboard 118, which are communicatively coupled to the testing computing device 108. For instance, each of the monitor 116 and keyboard 118 may connect to the testing computing device 108 through a corresponding cable, such as a USB cable.

The computing DUTs 120, the testing computing device 108, the hubs 112, 113, 114 and the monitor 116 may each be connected to power. For instance, each may include a power cable connected to, for example, a power strip. Each computing DUT 120 can include, for instance, any type of computer such as Apple® computers, Windows® computers, and Macintosh® computers, any type of laptop such as Mac® laptops and Windows® laptops, any type of tablet, or any other suitable computing device. In some examples, a first subset of the computing DUTs 120 include one type of computer, and a second subset of the computing DUTs 120 include a second type of computer.

The testing frame 402 may be constructed out of a metal, such as aluminum, an alloy, or any other suitable material. As illustrated, the testing cabinets 404 each house a computing DUT 120 that is secured to a floor of the testing cabinet 104 with a DUT bracket 121. Further, each testing cabinet 404 houses testing equipment including one or more of a camera 130, a microphone 140, a speaker 132, and, in some examples, a robotic arm 137. The camera 130 is positioned and configured to capture images of a display of the computing DUT 120. The microphone 140 is positioned and configured to capture audio from the computing DUT 120 (e.g., from a speaker of the computing DUT 120). The speaker 132 is positioned and configured to play audio that can be captured by a microphone of the computing DUT 120. In addition, the robotic arm 137 is positioned and configured to engage a keyboard, touchpad, or touchscreen of the computing DUT 120.

The testing computing device 108 may be communicatively coupled to each of the computing DUTs 120 through one or more wired, or wireless, connections. For instance, as described herein, the testing computing device 108 may connect to a same network (e.g., Wi-Fi network, BlueTooth network, etc.) as the computing DUT 120, and may communicate with the computing DUT 120 over the network. Additionally or alternatively, the computing DUT 120 and the computing DUT 120 may connect via one or more hubs 112, 113, 114.

The testing computing device 108 may perform any of the tests described herein on one or more of the computing DUTs 120. For example, testing computing device 108 may test, for each of the computing DUTs 120, one or more of: internal diagnostics (e.g., built-in-test, memory test), Wi-Fi connection, Bluetooth connection, display, speakers, microphone, line out, camera, touchpad, keyboard, ambient light sensor, battery, SD Card, fingerprint sensor, touch bar, and one or more communication ports such as an Ethernet jack, an HDMI port, a USB port, or a FireWire jack. In some examples, the testing computing device 108 simultaneously performs testing of the computing DUTs 120. For instance, the testing computing device 108 may cause a first set of tests to be performed on computing DUTs 120 of a first type, and a second set of tests to be performed on computing DUTs of a second type.

In some examples, testing computing device 108 may maintain a DUT table that maps each of the computing DUTs 120 to, for instance, a port number of one of a USB hubs 112. For example, the DUT table may map a first computing DUTs 120 to a first USB port of USB hub 112. Similarly, the DUT table may map a second computing DUT 120 to a second USB port of USB hub 112, and a third computing DUT 120 to a third USB port of USB hub 112. As such, testing computing device 108 can identify each computing DUT 120 connected to USB hub 112 as the computing DUT 120 mapped to that particular USB port based on the DUT table.

In some examples, the DUT table, additionally or alternatively, maps each of the computing DUTs 120 to a network address associated with each corresponding USB cable 207. For instance, each USB cable 207 may include a corresponding network address (e.g., IP address). The DUT table may map, for instance, the network address of USB cable 207 to a particular computing DUT 120. As such, testing computing device 108 can identify each computing DUT 120 connected to USB hub 112 as the computing DUT 120 mapped to that particular network address based on the DUT table.

Figure 5:
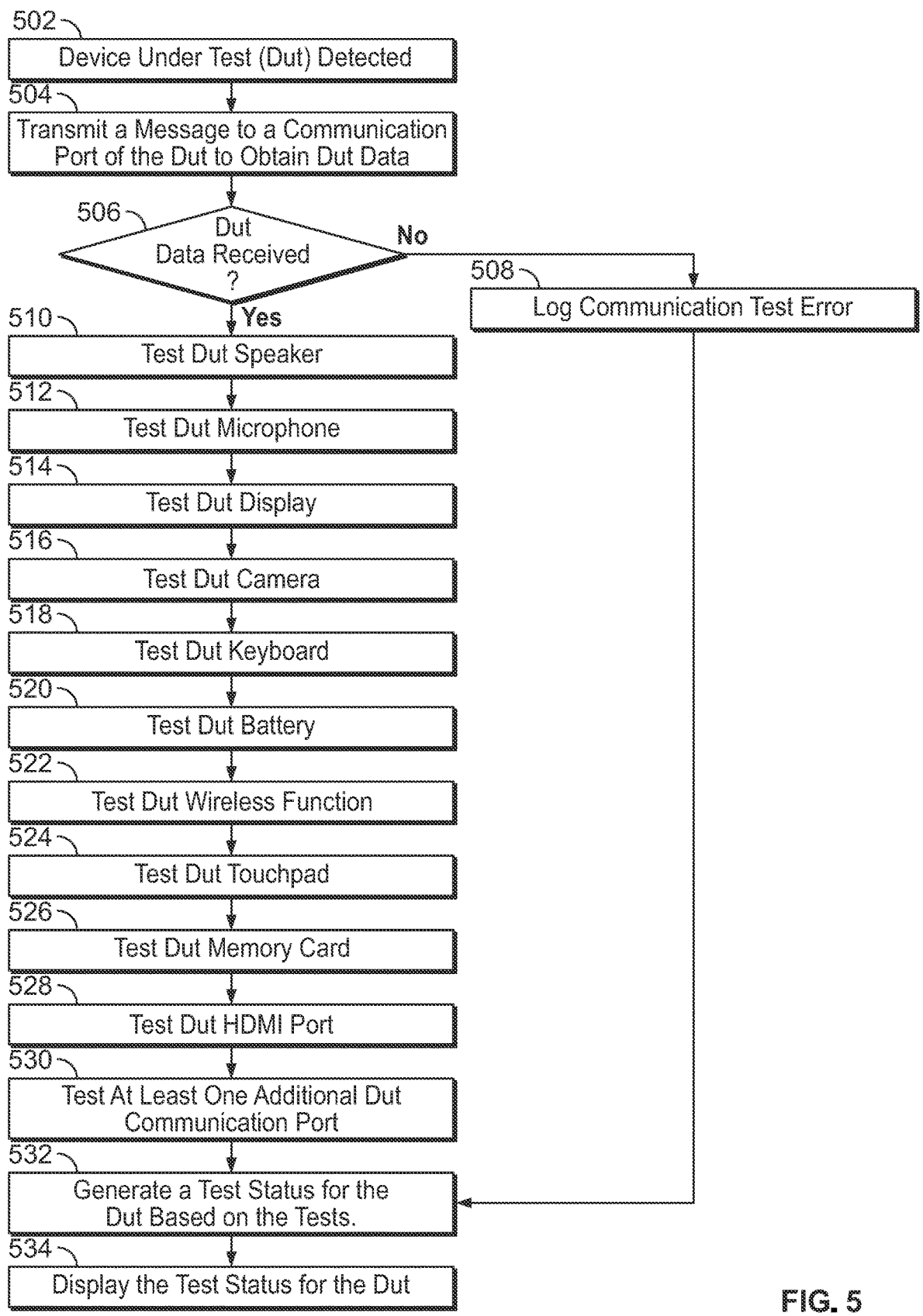
FIG. 5 is a flowchart of an exemplary process for performing functional testing of a computing device under test, in accordance with some embodiments.

FIG. 5 is a flowchart of an exemplary process 500 that can be carried out by a testing computing device, such as testing computing device 108, for performing functional testing of a computing device under test, such as a computing DUT 120. Beginning at step 502, a computing DUT 120 is detected. For example, testing computing device 108 may be communicatively coupled to computing DUT 120 over one or more wired, or wireless, networks. Testing computing device 108 may send a message (e.g., a "ping" message) to the computing DUT 120, and may receive a response (e.g., "ping reply") to the message. Based on the received response, the testing computing device 108 detects the computing DUT 120. In some examples, the testing computing device 108 send the message to a port or network address for the computing DUT 120 as defined within a DUT table stored in memory.

At step 504, testing computing device 108 transmits a message to a communication port of the computing DUT 120, such as a USB port or Ethernet port, to obtain device data for the computing DUT 120. For example, and upon receiving the message, the computing DUT 120 may transmit device data 302A, which may include a type (e.g., Apple® laptop, Windows® PC, etc.), a year of manufacture, a model number, and a serial number of the computing DUT 120. If, at step 506, the device data is not received (e.g., after a predetermined amount of time), the method proceeds to step 508, where a communication test error is logged. For example, the testing computing device 108 may generate a status indicating the communication error, and may store the status within device test results 302B for the computing DUT 120. The method then proceeds to step 532.

If, however, at step 506 the device data is received (e.g., within the predetermined amount of time), the method proceeds to step 510. At step 510, the testing computing device 108 performs any of the operations described herein to test a speaker of the computing DUT 120. For example, testing computing device 108 may transmit an audio message to the computing DUT 120 to cause the computing DUT 120 to play sound using at least one speaker. The testing computing device 108 may then cause a microphone 132 to capture the audio, and transmit an audio file of the captured audio to the testing computing device 108. As described herein, the testing computing device 108 may determine a status of the speaker based on the received audio file.

Further, at step 512, the testing computing device 108 performs any of the operations described herein to test a microphone of the computing DUT 120. At step 514, the testing computing device 108 performs any of the operations described herein to test a display of the computing DUT 120. At step 516, the testing computing device 108 performs any of the operations described herein to test a camera of the computing DUT 120. Further, at step 518, the testing computing device 108 performs any of the operations described herein to test a camera of the computing DUT 120.

Additionally, at step 518, the testing computing device 108 performs any of the operations described herein to test a keyboard of the computing DUT 120. For example, the testing computing device 108 may cause a robotic arm 137 to engage one or more keys of the keyboard, and may receive a message from the computing DUT 120 identifying the engaged one or more keys. Further, at step 520, the testing computing device 108 performs any of the operations described herein to test a battery of the computing DUT 120. At step 522, the testing computing device 108 performs any of the operations described herein to test a wireless function (e.g., wireless network) of the computing DUT 120. For example, the testing computing device 108 may attempt to detect the computing DUT 120 on a wireless network, such as a Wi-Fi or Bluetooth network, to test the wireless function of the computing DUT 120.

Additionally, at step 524, the testing computing device 108 performs any of the operations described herein to test a touchpad of the computing DUT 120. For example, the testing computing device 108 may cause the robotic arm 137 to engage the touchpad to determine the functionality of the touchpad.

At step 526, the testing computing device 108 performs any of the operations described herein to test a memory card of the computing DUT 120. For example, the testing computing device 108 may transmit a message to the computing DUT 120 requesting a read of the memory card, causing the computing DUT 120 to read the memory card and transmit a response to the testing computing device 108 with data read from the memory card. The testing computing device 108 may compare the received data with expected data to determine a status of memory card functionality. For example, if the received data matches the expected data, the test passed. Otherwise, if the received data does not match the expected data, the test fails.

Proceeding to step 528, the testing computing device 108 performs any of the operations described herein to test an HDMI port of the computing DUT 120. Similarly, at step 539, the testing computing device 108 performs any of the operations described herein to test an additional port of the computing DUT 120, such as a USB port or Ethernet port.

At step 532, the testing computing device 108 generates a test status for the computing DUT 120 based on the tests of steps 504 through 530. For example, the testing computing device 108 may generate a status for each test (e.g., passed, failed, not available, etc.), and may store the generated status within device test results 302B in working memory 302. At step 534, the testing computing device 108 displays the test status, such as on monitor 116 or display 306.

Figure 6:
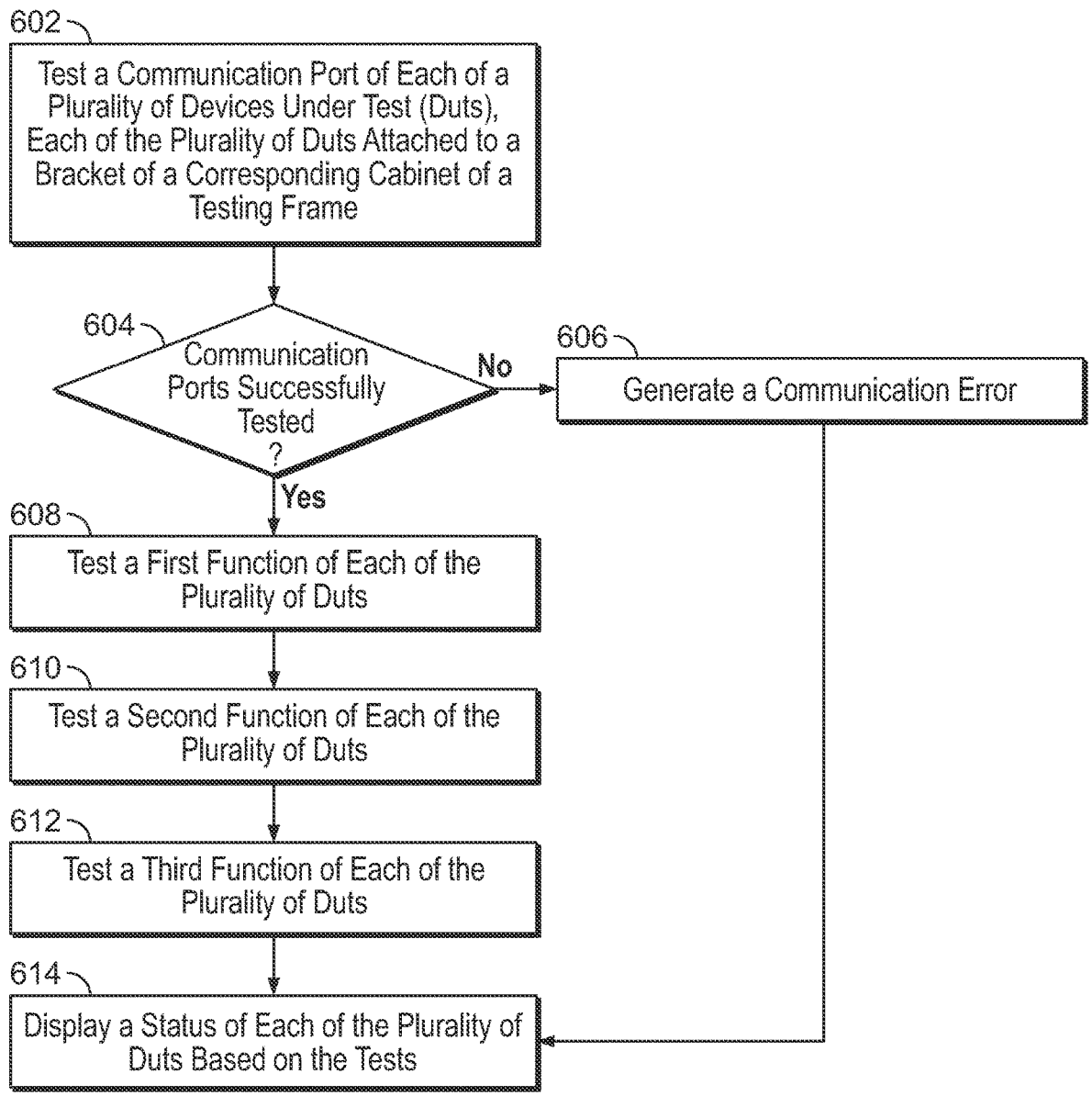
FIG. 6 is a flowchart of an exemplary process for testing a plurality of computing devices under test, in accordance with some embodiments.

FIG. 6 is a flowchart of an exemplary process 600 that can be carried out by a testing computing device, such as testing computing device 108, for testing a plurality of computing devices under test, such as computing DUTs 120A, 120B, 120C, 120D, 120E, 120F, 120G, and 120H. Beginning at step 602, the testing computing device 108 performs any of the operations described herein to test a communication port of each of a plurality of computing DUTs 120. Each of the plurality of computing DUTs 120 are attached to a bracket of a corresponding testing cabinet of a testing frame. For instance, testing computing device 108 may be positioned within a control cabinet 406 of a multiple computing device testing system 400. The multiple computing device testing system 400 includes a plurality of testing cabinets 404, where each testing cabinet houses a corresponding computing DUT 120 attached by a bracket 121. The testing computing device 108 may be communicatively coupled to a communication port of each of the computing DUTs 120 through, for example, one or more hubs 112, 113, 114. The testing computing device 108 may test at least one communication port of each of the computing DUTs 120, as described herein.

At step 604, the testing computing device 108 determines, for each of the plurality of computing DUTs 120, whether the communication port tested successfully. For any communication port that did not test successfully, the method proceeds to step 606, where a communication error is generated. The method then proceeds to step 614. For any communication port that tests successfully, the method proceeds to step 608.

At step 608, the testing computing device 108 performs any of the operations described herein to test a first function of each of the plurality of computing DUTs 120. For example, as described herein, the testing computing device 108 may test a speaker, camera, display, ambient light sensor, wireless connection, touchpad, or keyboard of each of the plurality of computing DUTs 120. In some examples, the testing computing device 108 causes each of the plurality of computing DUTs 120 to perform a test simultaneously. Further, and at step 610, the testing computing device 108 performs any of the operations described herein to test a second function of each of the plurality of computing DUTs 120. At step 612, the testing computing device 108 performs any of the operations described herein to test a third function of each of the plurality of computing DUTs 120.

Proceeding to step 614, the testing computing device 108 performs any of the operations described herein to display a status of each of the plurality of computing DUTs 120 based on the tests of steps 602, 608, 610, and 612. For example, the testing computing device 108 may display, on monitor 116, an indication of whether each test passed, or failed, for each of the plurality of computing DUTs 120.

Although the methods described above are with reference to the illustrated flowcharts, it will be appreciated that many other ways of performing the acts associated with the methods can be used. For example, the order of some operations may be changed, and some of the operations described may be optional.

In some examples, a testing system includes a testing frame with at least one testing cabinet for housing a computing device under test. The testing cabinet can also include testing equipment such as a camera, a microphone, a speaker, a color test sheet, and an ambient light sensor. Further, the testing frame includes a control cabinet for housing a testing computing device, where the testing computing device is communicatively coupled, through one or more hubs, to each computing device under test. The testing frame may also include a bracket that secures a monitor and a keyboard, where the monitor and keyboard are communicatively coupled to the testing computing device. The testing computing device can control the testing equipment to test various functions of the computing device under test, an may generate status based on the tests.

Advantageously, the embodiments described herein allow for testing one or more computing devices, such as computers and laptops. The embodiments may also allow for simultaneously performing one or more functional tests on a plurality of computing devices. Among other benefits, updating and testing efficiency of computing devices is increased, thereby saving time and decreasing costs.

The methods and systems described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed:

1. An apparatus comprising:
a testing frame comprising:
   a first testing cabinet housing a first computing device under test;
   a control cabinet housing a testing computing device, the testing computing device being directly communicatively coupled to at least one communication port of the first computing device under test;
   a first bracket securing a camera to the first testing cabinet;
   a second bracket securing a microphone to the first testing cabinet; and
   at least a third bracket securing a monitor and a shelf for a keyboard, wherein
the monitor and the keyboard are communicatively coupled to the testing computing device,
the testing frame further comprises a second testing cabinet housing a second computing device under test that is also directly communicatively coupled to the testing computing device, and
the testing computing device is configured to perform testing of both the first computing device under test and the second computing device under test, such that a first set of tests is performed on the first computing device under test at the same time a second set of tests is performed on the second computing device under test.

2. The apparatus of claim 1, wherein the control cabinet houses at least one hub, wherein the testing computing device is directly communicatively coupled to each computing device under test through the at least one hub.

3. The apparatus of claim 2, wherein the testing computing device is connected to the at least one hub using a first cable, and each computing device under test is connected to the at least one hub using a corresponding second cable.

4. The apparatus of claim 1, wherein the apparatus comprises a speaker coupled to the first bracket.

5. The apparatus of claim 1, wherein the testing frame comprises a fourth bracket, the fourth bracket securing the first computing device under test to the testing cabinet.

6. The apparatus of claim 1 comprising a color test sheet secured to the first testing cabinet, wherein a field-of-view of a camera of the first computing device under test includes the color test sheet.

7. The apparatus of claim 1, wherein the testing computing device is configured to identify each computing device under test based on a table stored in a memory device that maps each of a plurality of computing devices to a network address.

8. The apparatus of claim 1, wherein the testing computing device is configured to test at least one function of each computing device under test using at least one of the camera and the microphone.

9. The apparatus of claim 8, wherein the testing computing device is configured to:
   transmit a first message to each computing device under test to display a first image;
   transmit a second message to the camera to cause the camera to capture a second image of the display of the first image;
   receive the second image from the camera;
   determine a first status based on the second image;
   transmit a third message to each computing device under test to play a sound;
   transmit a fourth message to the microphone to cause the microphone to capture the sound;
   receive, from the microphone, audio data characterizing the captured sound; and
   determine a second status based on the audio data.

10. The apparatus of claim 1, wherein the testing frame comprises a robotic arm secured to the testing cabinet, and wherein the testing computing device is configured to transmit a message to the robotic arm to cause the robotic arm to engage a surface of each computing device under test.

11. The apparatus of claim 1, wherein the testing frame comprises at least a third testing cabinet, the at least second testing cabinet comprising:
   a fourth bracket securing a second camera to the at least second testing cabinet; and
   a fifth bracket securing a second microphone to the at least second testing cabinet.

12. An apparatus comprising:
a testing frame comprising:
   a plurality of testing cabinets, each of the plurality of testing cabinets configured to house a computing device under test; and a control cabinet configured to house a testing computing device, wherein each of the plurality of testing cabinets comprise:
- a first bracket securing a camera to a corresponding testing cabinet;
- a second bracket securing a microphone to the corresponding testing cabinet; and
- at least a third bracket configured to secure a monitor and a shelf for a keyboard to the testing frame, wherein the testing computing device is directly communicatively coupled to each of the plurality of computing devices under test and configured to perform testing of each of the plurality of computing devices under test such that a first set of tests is performed on a first of the plurality of computing devices under test at the same time a second set of tests is performed on a second of the plurality of computing devices under test.

13. The apparatus of claim 12, comprising a robotic arm secured to the corresponding testing cabinet.

* * * * *